Sept. 20, 1960 R. H. KIMBLE ET AL 2,953,044
MACHINE TOOL DEVICE
Filed April 20, 1959
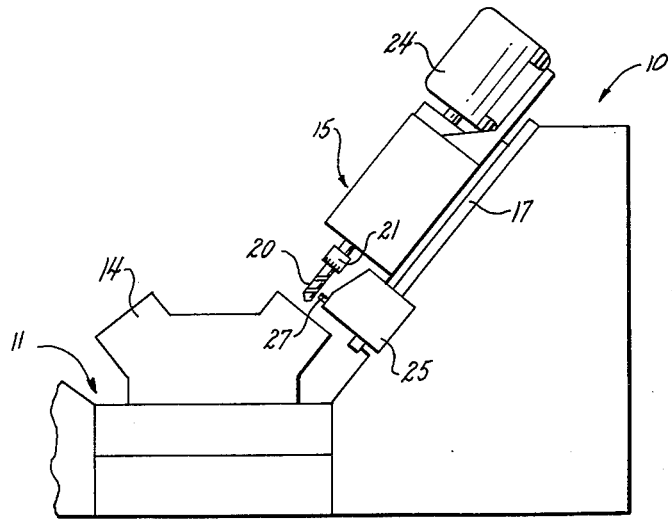
FIG.1
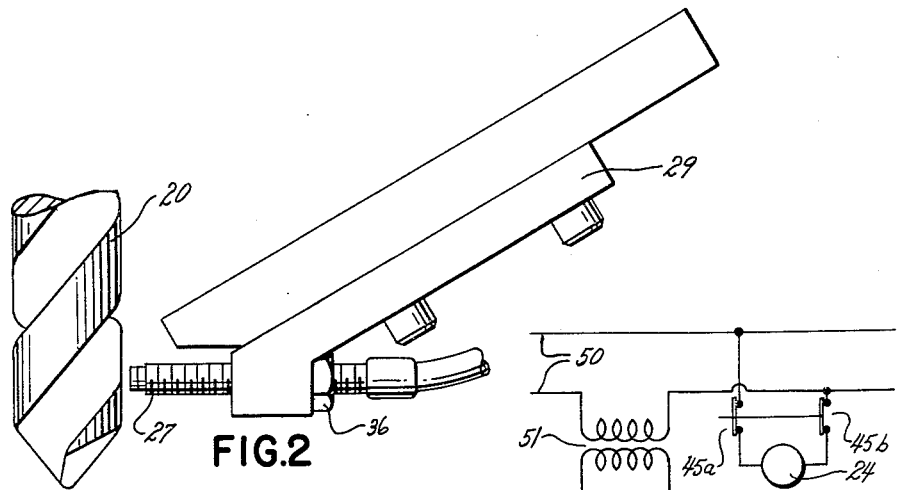
FIG.2
FIG.4
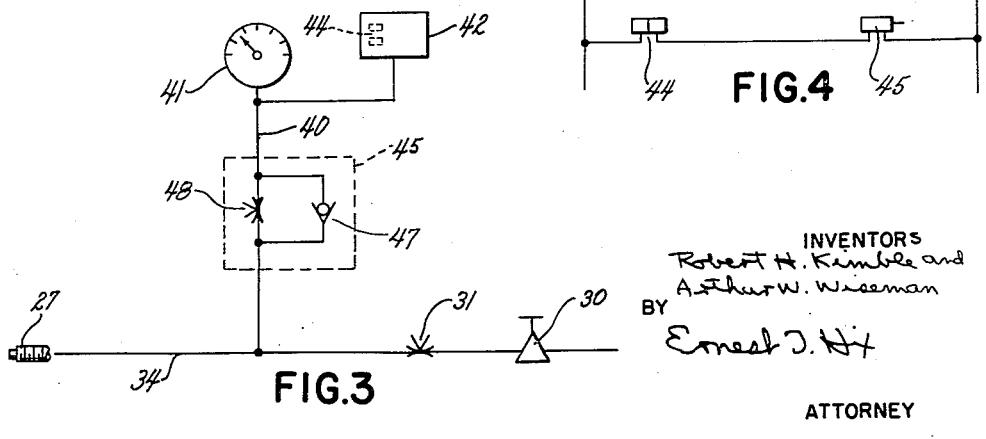
FIG.3
INVENTORS
Robert H. Kimble and
Arthur W. Wiseman
BY
Ernest J. Hit
ATTORNEY

United States Patent Office

2,953,044
Patented Sept. 20, 1960

2,953,044

MACHINE TOOL DEVICE

Robert H. Kimble, Dayton, and Arthur W. Wiseman, Xenia, Ohio, assignors to The Sheffield Corporation, Dayton, Ohio, a corporation of Delaware Filed Apr. 20, 1959, Ser. No. 807,665

6 Claims. (Cl. 77—5)

This invention relates to controls for machine tools and more particularly to an apparatus for controlling drilling machines and the like.

In many automatic machining processes it is important to determine if the desired operation has been carried out. This is particularly critical in sequential operations where a second operation cannot be properly or safely performed unless the preceding operation has been completed. For example, in automatic production lines where a workpiece is transferred from station to station, a hole might be drilled at one station and a liner or sleeve inserted in the hole at the next. If the end or tip of the drill were broken off it is possible that its absence would not be detected, resulting in the drilling unit cycling without completing a hole in the workpiece. This not only means that a defective workpiece has been produced but jamming and destruction of equipment at the next station may occur.

It is accordingly an object of this invention to provide an apparatus for detecting the presence of a drill or other rotatable fluted forming tool and providing a signal if a tool is not in position, the apparatus operating in a non-contact manner and including an extremely sensitive and reliable construction which is economical to manufacture.

It is a further object to provide such an apparatus including a pneumatic circuit terminating in a detector nozzle of small size which can be located in close proximity to one side of the tool adjacent the tip thereof to detect the presence of the full tool length and which is not influenced by the magnetic effect of other metallic masses such as work chips and the like.

It is a further object to provide such an apparatus wherein exhaust from the detector nozzle is alternately controlled by flutes of a rotating fluted tool to provide cyclic pressure increases in the circuit, means being provided to maintain a continuous pressure condition on a pressure responsive control switch in response to the cyclic increases, the switch being responsive to a pressure drop below that pressure condition to signal the absence of an effective tool in operative position and terminate operation of the machine.

It is a further object of the present invention to provide such an apparatus including a detector circuit providing the cyclic pressure increases and a branch passage leading therefrom to the pressure responsive switch unit, means being provided permitting unrestricted flow into the branch passage upon pressure increase in the chamber and allowing only restricted return flow upon chamber pressure decrease, whereby an increased pressure is maintained on the switch means during proper tool operation and a switch actuating pressure drop occurs in the absence of a properly operating tool.

Other objects and advantages of the invention will be apparent from the following description, the appended claims, and the accompanying drawing, in which, Figure 1 is a view in elevation of an exemplary drilling machine used on a production line and embodying the present invention, Figure 2 is an enlarged fragment illustrating a portion of the apparatus of Figure 1 and showing the detector nozzle in close opposition to a drill, Figure 3 is a diagram of a pneumatic circuit involved in the operation of the present apparatus, and Figure 4 is a diagram of an electrical control circuit responsive to operation of the pneumatic circuit of Figure 3.

While particularly useful as applied to detecting the presence of a fluted drill the present invention would also be useful as applied to other similar fluted members such as reamers and the like.

In the illustrated exemplary embodiment of the invention an automatically cycling drilling machine is included in a production line for drilling a hole in an automotive cylinder block. As the drill head lowers a hole is made. The drill head then retracts to clear the block so it can be transferred to the next station. The pneumatic drill detector apparatus disclosed includes a detector nozzle controlled by the rotating drill. In the absence of a properly operating drill in position, a signal is automatically provided which, in this instance, stops operation of the drilling machine and the production line to allow replacement of the drill.

Referring more particularly to the drawings, Figure 1 shows a drilling machine 10 alongside a transfer line 11. Drilling machine 10 is but one of a number of sequential operating stations to which a workpiece such as cylinder block 14 is transferred by conventional transfer structure not shown in detail.

Machine 10 includes a drill head 15 of a commercially available type reciprocably mounted on ways 17 for downward movement to drill a hole in the upper surface of block 14 and for retraction to clear the block for movement to the next operating station of line 11. Drill 20 is mounted in pilot 21 and is continuously rotated by electric motor 24 forming a part of head 15.

Motor 24 also drives a hydraulic pump, providing the power source for the upward and downward movements of the head.

A drill detector unit 25 embodying the present invention is mounted on the base of machine 10 in a stationary position. Detector apparatus 25 includes a detector nozzle 27 supported by bracket 29 (see Figure 2). Nozzle 27 is in close opposing relationship to the lands and flutes of drill 25 so that the exhaust from the nozzle is controlled thereby. The detector nozzle can be placed very close to the cutting edges of the drill tip. It does not require the absence of any extended portion of the drill for response and false signals of drill presence cannot be caused by the magnetic influence of work chips or other metallic masses.

Detector nozzle 27 is at the outlet end of a pneumatic circuit shown diagrammatically in Figure 3. This circuit receives air under pressure from a conventional source. An adjustable pressure regulator 30 maintains the supply of pressure at a desired level. From regulator 30 the air passes through an adjustable restriction indicated diagrammatically at 31 and then through conduit 34 to nozzle 27 where it exhausts to atmosphere. The pressure within the chamber provided by conduit 34 downstream of adjustable restriction 31 will thus vary with the changes in exhaust flow through nozzle 27.

Nozzle 27 is threaded in the lower portion of bracket 27 so that it can be precisely adjusted toward and from drill 20. It is clamped in position by lock nut 36. The pressure level within the pressure chamber will be at a minimum condition when the outlet end of nozzle 27 is completely unobstructed. Thus as drill 20 is continuously driven by motor 24 there will be cyclic pressure increases within the chamber downstream of restriction 31 as the lands and flutes alternately pass in close opposition to the nozzle outlet.

A branch passage 40 leads from conduit 34 and communicates with the pressure chamber provided thereby. Passage 40 is dead ended in a pressure gage 41 and a pressure responsive switch unit 42. Unit 42 can be of the type illustrated and described in more detail in Patent 2,878,334, issued March 17, 1959, wherein contacts such as indicated at 44 can be adjusted open at a predetermined pressure level within branch passage 40, signaling the absence of a drill or drill portion. A flow control means 45 is provided between the pressure chamber and passage 40. In this embodiment it includes a check valve 47 allowing free flow to passage 40 but preventing return flow through the valve. An adjustable restrictor 48 is provided in parallel to valve 47 in unit 45 allowing return flow from passage 40 to the pressure chamber but at an adjusted rate. Thus as cyclic pressure increases occur in conduit 34 downstream of restrictor 31 these increases are transmitted to and maintained in branch passage 40, effective on pressure responsive switch unit 42. In view of the fact that return flow upon pressure decreases in conduit 34 is limited by restrictor 48 the pressure condition within branch passage 40 is maintained in a range above the minimum pressure which would occur with nozzle 27 unobstructed. The switch unit 42 is adjusted to open contacts 44 at a pressure condition below this range but above the minimum pressure in the usual application.

In one commercial application of the present invention nozzle 27 is adjusted and clamped on bracket 29 to have a clearance of .003 inch relative to the outside diameter of drill 20. With a pressure of 60 pounds per square inch supplied by regulator 30, switch unit 42 is adjusted to operate at a pressure of 24 pounds per square inch. During the set up operation with the drill rotating, adjustable restrictor 48 is set to obtain a steady pressure reading on gage 41 of 28 pounds per square inch. While the pressure within conduit 34 and the pressure chamber provided thereby will cyclically increase as drill 20 rotates, the condition within branch passage 40 will be relatively constant. When a drill or drill portion is broken or otherwise lost from head 15, a pressure drop immediately occurs downstream of restriction 31 to signal the condition. As the head 15 retracts the entire length of the drill is effectively "scanned" as it passes past nozzle 27. As the pressure drop occurs the pressure level within branch passage 40 will decrease by bleeding through restrictor 48 and when the pressure level reaches 24 pounds per square inch contacts 44 of unit 42 will open.

Electric motor 24 of drill head 15 is included in the circuit of Figure 4, energized through leads 50 from a suitable source of alternating current. A control circuit is energized from leads 50 through transformer 51. This control circuit includes contacts 44 in series with a signal relay 45. When contacts 44 open indicating the absence of a drill 20 in proper operating condition, relay 45 is immediately deenergized and its operation can be used for control functions as desired. For example, it can be used to stop operation of the entire production line to prevent the production of imperfect parts and the destruction of equipment at subsequent stations therealong. In the illustrated example of Figure 4, relay 45 controls contacts 45a and 45b to motor 24. Thus, in the absence of a drill, motor 24 is deenergized, stopping rotation of supporting pilot 21 and terminating the supply of hydraulic power for advancing and retracting head 15.

Thus it is seen that a drill presence detector and control apparatus have been provided which operate through pneumatic circuitry in the simplest of manners. The operation is non-contact in nature, preventing the mar or damage of detection equipment and the pneumatic and electrical circuitry involved is simple and reliable in operation.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A tool presence detector for use with a rotatable fluted forming tool comprising, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means for mounting said nozzle in flow control opposition with the fluted tool whereby pressure increases are cyclically obtained in said chamber as the tool rotates and flutes pass in opposition to said nozzle, means providing a branch passage in closed communication at one end with said chamber, flow control means in said branch passage for maintaining pressure in said branch passage in a range above said minimum pressure in response to said cyclic pressure increases, and pressure responsive signal means in said branch passage operative at a reference pressure below said pressure range in response to the absence of a tool and dropping of pressure in said chamber to said minimum level.

2. A tool presence detector for use with a reciprocably carried rotatable fluted forming tool comprising, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means for mounting said nozzle in a fixed position closely adjacent the side of the tool and near the end thereof when the tool is in retracted position, whereby pressure increases are cyclically obtained in said chamber as the tool rotates and flutes pass in opposition to said nozzle, means providing a branch passage in closed communication at one end with said chamber, flow control means in said branch passage for maintaining pressure in said branch passage in a range above said minimum pressure in response to said cyclic pressure increases, and pressure responsive signal means in said branch passage operative at a reference pressure below said pressure range in response to the absence of a tool and dropping of pressure in said chamber to said minimum level.

3. A tool presence detector for use with a rotatable fluted forming tool comprising, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means for mounting said nozzle in flow control opposition with the tool whereby pressure increases are cyclically obtained in said chamber as the tool rotates and flutes pass in opposition with said nozzle, means providing a branch passage in closed communication at one end with said chamber, flow control means in said branch passage permitting unrestricted flow into said branch passage upon pressure increases within said chamber and restricted return flow upon decrease in chamber pressure, whereby pressure in said branch passage is maintained in a range above said minimum pressure in response to said cyclic pressure increases, and pressure responsive signal means in said branch passage operative at a reference pressure below said pressure range in response to the absence of a tool and dropping of pressure in said chamber to said minimum level.

4. A tool presence detector for use with a rotatable fluted forming tool comprising, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means for mounting said nozzle in flow control opposition with the tool whereby pressure increases are cyclically obtained in said chamber as the tool rotates and flutes pass in opposition with said nozzle, means providing a branch passage in closed communication at one end with said chamber, flow control means in said branch passage including a one-way check valve permitting flow from said chamber into said passage upon pressure increases and a restriction permitting restricted return flow to said chamber upon pressure decreases within the chamber, whereby pressure in said branch passage is maintained in a range above said minimum pressure in response to said cyclic pressure increases, and controlling switch means in said branch passage operative at a reference pressure below said pressure range in response to the absence of a tool and dropping of pressure in said chamber to said minimum level.

5. A drill presence detector and control apparatus for use with a machine tool having a reciprocable drill and drive means therefor comprising, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means mounting said nozzle in flow control opposition with a drill during its rotation and reciprocation and adjacent the tip thereof when the drill is in retracted position whereby pressure increases are cyclically obtained in said chamber as the drill rotates and lands and flutes pass alternately into opposition with said nozzle, means providing a branch passage in closed communication at one end with said chamber, flow control means in said branch passage for maintaining pressure in said branch passage in a range above said minimum pressure in response to said cyclic pressure increases, switch means including a pressure responsive actuating member connected to said branch passage operative at a reference pressure below said pressure range in response to the absence of a drill and dropping of pressure in said chamber to said minimum level, and control means responsive to said switch means for stopping said drive means in the absence of a drill in operating position.

6. A drilling machine comprising a base, a drill head reciprocably mounted on said base including a drill and drive means therefor, a pneumatic circuit including in series communication a pressure regulator, a flow restriction and a detector nozzle exhausting to atmosphere providing a pressure chamber downstream of said restriction in which pressure varies with flow through said nozzle with a minimum pressure existing when said nozzle is unobstructed, means on said base fixedly mounting said nozzle thereon in flow control opposition with one side of the drill and adjacent the tip thereof when the drill is in retracted position whereby pressure increases are cyclically obtained in said chamber as the drill rotates and lands and flutes pass alternately into opposition with said nozzle, means providing a branch passage in closed communication at one end with said chamber, flow control means in said branch passage for maintaining pressure in said branch passage in a range above said minimum pressure in response to said cyclic pressure increases, switch means including switch contacts and pressure responsive expansible actuating means in communication with said branch passage effective at a reference pressure below said pressure range to operate said contacts in response to the absence of a drill and dropping of pressure in said chamber to said minimum level, and control means for stopping said drive means in response to such operation of said contacts.

References Cited in the file of this patent

UNITED STATES PATENTS

| | | |
|---|---|---|
| 1,289,390 | Calleson | Dec. 31, 1918 |
| 2,625,061 | Mansfield | Jan. 13, 1953 |